(12) United States Patent
Coit et al.

(10) Patent No.: US 8,620,742 B2
(45) Date of Patent: Dec. 31, 2013

(54) ADVERTISEMENT APPROVAL

(75) Inventors: Kristin Coit, Palo Alto, CA (US);
Karen Crow, Redwood City, CA (US);
Alana Karen, Mountain View, CA (US);
Emel Mutlu, Millbrae, CA (US)

(73) Assignee: Google Inc., Mountain View, CA (US)

( * ) Notice: Subject to any disclaimer, the term of this patent is extended or adjusted under 35 U.S.C. 154(b) by 2028 days.

(21) Appl. No.: 10/814,102

(22) Filed: Mar. 31, 2004

(65) Prior Publication Data
US 2005/0222902 A1 Oct. 6, 2005

(51) Int. Cl.
*G06Q 30/00* (2012.01)

(52) U.S. Cl.
USPC .................. 705/14.4; 705/14.1; 705/14.7

(58) Field of Classification Search
USPC .................. 705/14, 14.1, 14.4, 14.41, 14.7
See application file for complete search history.

(56) References Cited

U.S. PATENT DOCUMENTS

| 5,933,811 | A | * | 8/1999 | Angles et al. | ......... 705/14.56 |
| 2003/0037041 | A1 | | 2/2003 | Hertz | |
| 2005/0021649 | A1 | * | 1/2005 | Goodman et al. | ......... 709/207 |

FOREIGN PATENT DOCUMENTS

| KR | 2003-0051709 | 6/2003 |
| KR | 2003-0069567 | 8/2003 |
| KR | 10-2004-0025007 | 3/2004 |
| WO | WO 02/31619 A2 | 4/2002 |
| WO | WO 2004/027669 A1 | 4/2004 |

OTHER PUBLICATIONS

English language translation of the Notice of Preliminary Rejection dated Nov. 26, 2007, pp. 1-9.
PCT International Search Report (PCT/ISA/210) for International Application No. PCT/US05/10821 (2 pgs.) (Oct. 26, 2006).
PCT Written Opinion of the International Searching Authority (PCT/ISA/237) for International Application No. PCT/US05/10821 (7 pgs.) (Oct. 26, 2006).

* cited by examiner

*Primary Examiner* — John G Weiss
*Assistant Examiner* — Sam Refai
(74) *Attorney, Agent, or Firm* — Fish & Richardson P.C.

(57) ABSTRACT

Large groups of Web ads may, at least in part, be approved automatically. A subset of a group of ads is selected, and a manual review process is used to determine which ads in the subset are not acceptable, and perhaps the reasons for the disapprovals. A distrust score may then be determined using the ads in the subset that were disapproved. The distrust score may also use the reasons for disapproval. The distrust score may then be compared with a predetermined threshold. If the distrust score is less than the threshold, the ads in the group may be accepted. If the distrust score is equal to or greater than the threshold, the ad group is not automatically accepted.

29 Claims, 5 Drawing Sheets

ADVERTISEMENT APPROVAL

1. BACKGROUND OF THE INVENTION

1.1 Field of the Invention

The present invention concerns advertising. In particular, the present invention concerns processes for approving ads, such as Web ads for example.

1.2 Background Information

Advertising using traditional media, such as television, radio, newspapers and magazines, is well known. Recently, advertising over more interactive media has become popular. For example, as the number of people using the Internet has exploded, advertisers have come to appreciate media and services offered over the Internet as a potentially powerful way to advertise.

Web page-based ads (also referred to as "Web ads") are often presented to their advertising audience in the form of "banner ads" (i.e., a rectangular box that includes graphic components). When a member of the advertising audience (referred to as a "viewer" or "user" in the Specification without loss of generality) selects one of these banner ads by clicking on it, embedded hypertext links typically direct the viewer to a page (which may be referred to as the "landing page" of the ad) of the advertiser's Website where they can be presented with marketing information and/or consummate a transaction.

Typically, various Websites place Web ads from various advertisers on their pages. By charging a fee for such placements from the advertiser, the Website gets a source of income. Further, some entities accept ads from advertisers and supply those ads to other entities to place on their Web pages or page views of those Web pages. This is sometimes referred to as "syndication." Whether a Website serves ads on its own pages or to the pages of a syndication partner, such a Website may be referred to as an "ad network".

Before placing an ad on its own Website, or syndicating an ad to another's Website, it is important to review the ad to ensure that it is correct and appropriate. Such a review may be used to identify such things as incorrect punctuation, capitalization, grammar, text spacing, or price, to name just a few. Also, such a review may be used to identify forbidden text, unacceptable content, improper lists, repetition, inappropriate superlatives, promotional offers, or targeting keywords or other serving constraints that are too general, among other things.

In some current ad networks, the number of ads that are reviewed can easily reach the thousands or tens-of-thousands. A manual review process is expensive and time-consuming, as well as prone to human error. Thus, an improved review process is desired.

2. SUMMARY OF THE INVENTION

In one embodiment consistent with the invention, a subset of an ad group (or ad set) is selected, each ad of the subset is manually approved or disapproved, a score (e.g., a percentage) is determined using the number of disapproved ads to the total number of ads in the subset, and at least one of the ads in the ad group that is not in the subset is accepted automatically if the score does not exceed a predetermined threshold. In at least some embodiments consistent with the invention, the determination of the score may use a severity of the reason for each disapproval.

In at least one embodiment consistent with the invention, at least one ad of an ad group received from a Trusted Advertiser is automatically approved.

In at least one embodiment consistent with the invention, a subset of a first ad group provided by a Trusted Advertiser is selected, a score (e.g., a percentage) is determined using the number of ads in the subset that are disapproved and the total number of ads in the subset, (and perhaps the reason(s) for disapproval(s)), and at least one ad in a second ad group received from the Trusted Advertiser is pulled from circulation if the score exceeds a predetermined threshold.

3. BRIEF DESCRIPTION OF THE DRAWINGS

4. DETAILED DESCRIPTION

The present invention may involve novel methods, apparatus, message formats and/or data structures for helping an ad network to at least partially automate the process of approving ads for circulation/syndication. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

In the following, environments in which, or with which, the present invention may operate are described in §4.1. Then, exemplary embodiments of the present invention are described in §4.2. Finally, some conclusions regarding the present invention are set forth in §4.3.

4.1 Environments in which, or with which, the Present Invention May Operate

Figure 1:
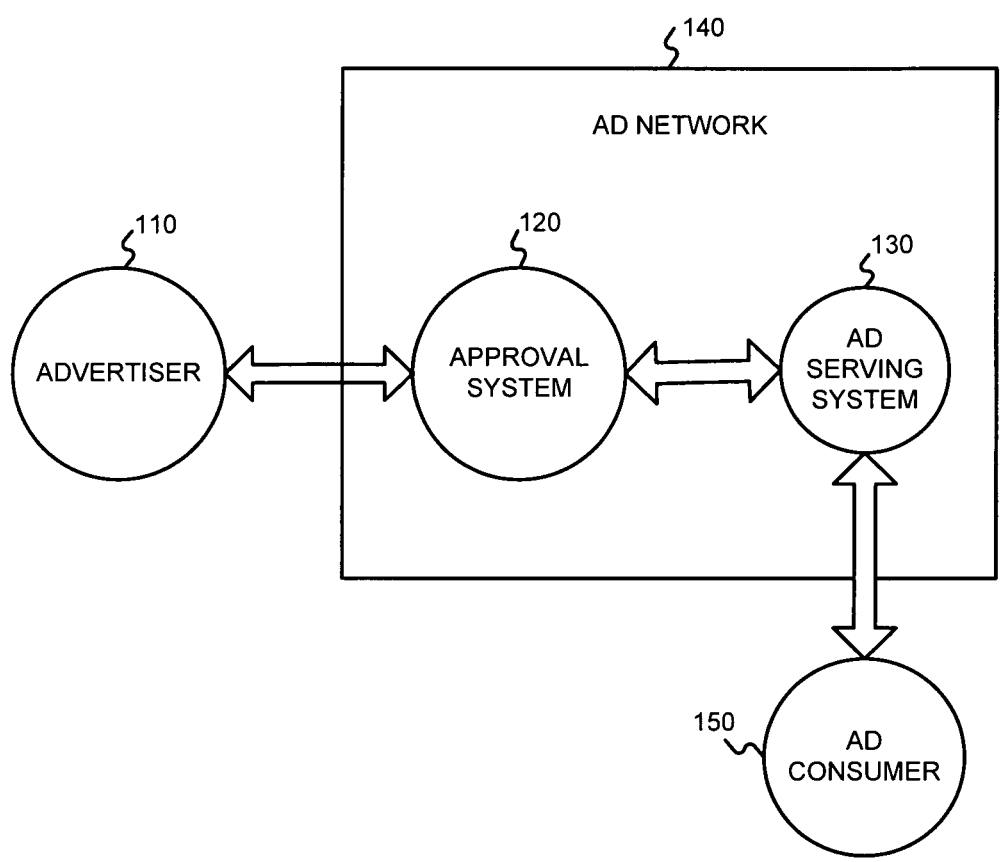
FIG. 1 is a diagram illustrating entities that may participate in an automated ad approval process.

FIG. 1 illustrates an exemplary environment in which the present invention may be used. The components may be able to communicate with one another, such as via a network or inter-network (not shown), for example. Each of one or more advertisers 110 has ads they would like to present to potential customers (not shown). An ad network 140 is interested in placing the ads in circulation where the potential customers, such as individuals using and viewing the Web pages of ad consumer 150, can see the ads. The advertiser(s) 110 compensates, either directly or indirectly via the ad network 140, the ad consumer 150 for this opportunity to have its ads rendered to potential customers. Further, the ad network 140 may sell ads, with or without additional software to control the placement of the ads, to other ad consumers 150 (e.g., other Website providers). This is sometimes referred to as "syndication."

Ad network 140 may advantageously use an approval system 120 to review the submitted ads prior to publication on its 140 Website or on the Website of a syndicated ad consumer. This review is generally a manual operation in which employees or agents of ad network 140 examine each ad for problems. Such problems may include incorrect punctuation, capitalization, grammar, spelling, or spacing. Other examples of problems may include incorrect prices or forbidden text. Still other examples may include inappropriate content, lists, superlatives, promotional offers, competitive claims, inappropriate products, inappropriate services and repetition.

Further, ad serving may use certain keywords from a query by the user to trigger the serving of specific ads related to the keyword. For example, if a user performed an online search for a Toyota car, Toyota advertisements might be placed on the search results page. This is one way that the ad network 140 can place many ads on various page views that are seen by many different users. However, if the targeting keywords requested by advertiser 110 are too general, the ads of that advertiser might be served too often. This might lead to a poor user experience, as well as poorly monetized ads and page views. Therefore, the manual review of the submitted ads in approval system 120 may include identifying such "too general" targeting keywords (or some other serving constraint(s)) as problems, and not approve those ads for use by content provider 140.

In one embodiment consistent with the invention, the approval system 120 is at least partially automated. As will be explained in greater detail below, at least some embodiments consistent with the invention may combine the manual review of a subset of the submitted ads with an automated review of the remainder of the ads. Whether or not the automated review is appropriate may be determined using a distrust score. The distrust score could be determined using a decline rate in the manual review and/or the severity of problems uncovered in the manual review.

Once the ads are approved, they are made available for serving by an ad serving system 130. When served, the approved ads are placed on ad network's 140 own Websites, or are syndicated to other content providers' Websites.

Figure 2:
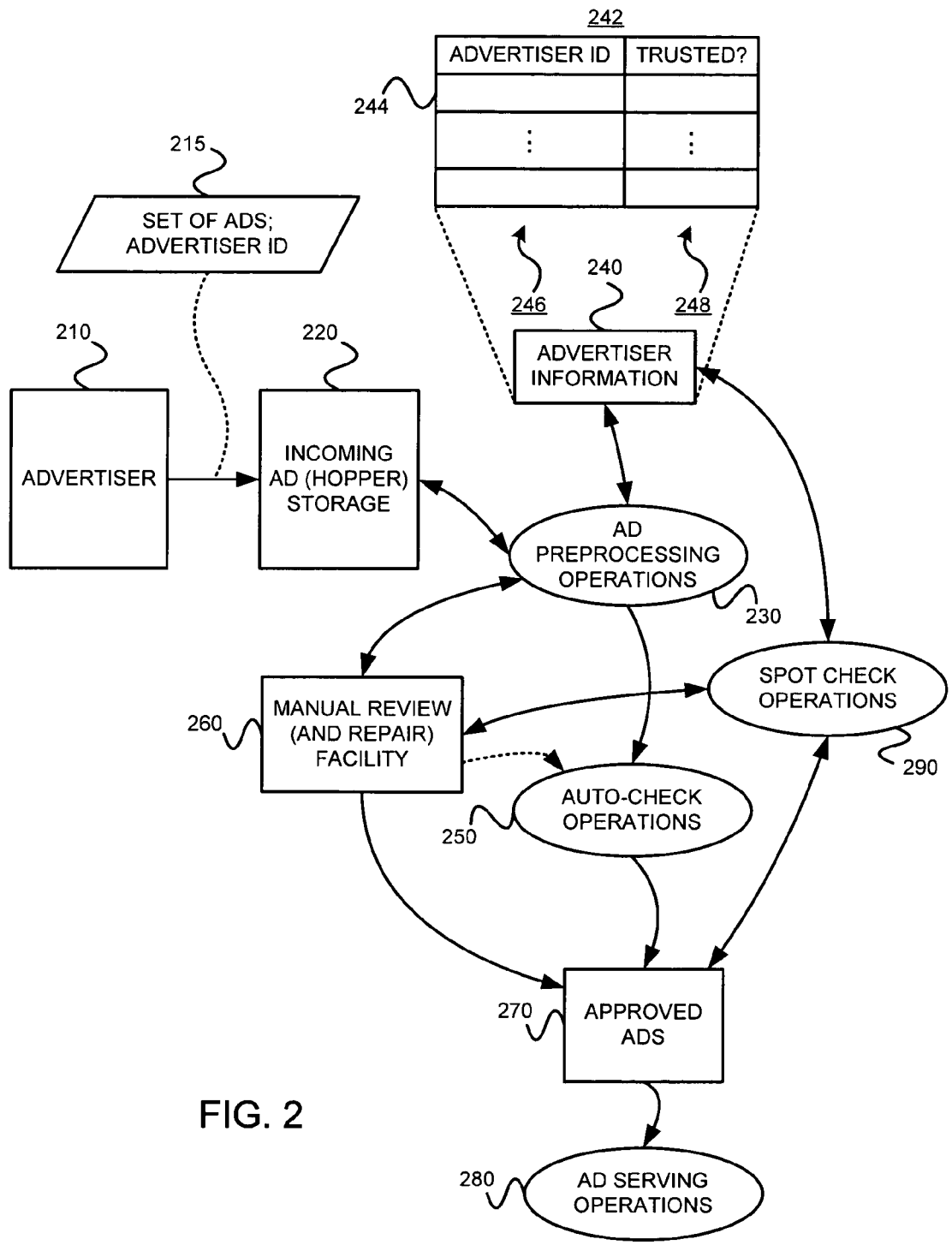
FIG. 2 is a bubble diagram illustrating operations that may be performed, and information that may be generated and/or stored, by an automated ad approval system consistent with the invention.

FIG. 2 is a bubble diagram illustrating operations that may be performed, and information that may be generated and/or stored, by an automated ad approval system consistent with the invention. In one embodiment of the invention, a particular advertiser 210 submits ads 215 to the ad network. The ads are placed in an incoming ad storage facility 220. If there is a large set of ads from the given advertiser (e.g., if advertiser 210 is a large advertiser (submits a large number of ads) or is an advertiser that often submits ads to the ad network), the ads may be forwarded to ad preprocessing operations 230. If the set of ads from advertiser 210 is too small, the submitted ads may be forwarded to a manual review facility 260, which may be another organization or workgroup of the ad network. Whether or not a set of ads from an advertiser is "large" may depend on whether or not a statistically significant sample of its ads can be analyzed.

For the ads forwarded to ad preprocessing operations 230, whether advertiser 210 is a Trusted Advertiser may be determined using advertiser information 240. For example, a lookup table 242 may include a number of entries, each entry including an advertiser ID 246 that may be used as a lookup key and their corresponding "trust" status 248. If not, ad preprocessing operations 230 may select an appropriate subset of the submitted ads (for example 20% or some statistically significant number) for analysis. Ad preprocessing operations 230 may request manual review of each of the ads in the subset for problems. Each identified problem ad could be flagged. Moreover, the flagged problem could be assigned a weighting factor, corresponding to the severity of the problem. For example, an ad containing inappropriate text might be considered to be a more severe problem than a spelling mistake. Therefore, "inappropriate content" might have a weighting factor of 3, whereas a spelling mistake might have a weighting factor of 1.

The number of ads of the subset approved and disapproved (declined), and/or the reasons for disapproval or problem severity weights could be used to determining (or update) a distrust score for the advertiser. In one embodiment consistent with the present invention, a percentage of the ads disapproved in the subset is adjusted using the weighting factors.

The distrust score may then be compared to a predetermined threshold. If the distrust score is lower than the threshold, the advertiser could be considered "trusted" and the entire group of ads submitted by the advertiser could be automatically accepted, without further manual review of the ads not included in the subset. Also, advertiser 210 would be identified as a "Trusted Advertiser," and future ads submitted by that advertiser could be automatically approved, as described below. Thus, for example, if the subset of ads had a combination of few problems along with the relative lack of severe problems, it might be assumed that the rest of the ad group is generally acceptable.

However, if the distrust score equals or exceeds the predetermined threshold, the rest of the ads of the ad group would be transferred from storage facility 220 to manual review facility 260. Also, advertiser 210 would not receive the designation of Trusted Advertiser.

Returning to the scenario where distrust score is less than the predetermined threshold, ad preprocessing operations 230 would cause all of the ads in the group from advertiser 210 in database 220 to be transferred to auto-check operations 250. Auto-check operations 250 may be an automated filter that examines the ad text for preselected content. Such content could be inappropriate words, inappropriate URL's, or inappropriate groups of words or phrases. The ads flagged by filter operations 250 as containing any of the preselected content may be forwarded to manual review facility 260. The ads which were not flagged as containing any of the preselected content may be stored in a database 270 of approved ads. Ad serving operations 280 could use ads of the database 270 when serving ads, (e.g., on the ad network's own Web pages, or into syndication, such as by providing the ads to other content providers for use on their Web pages).

Manual review facility 260 may be a group which may manually inspect the ads flagged for improper keywords, and may correct them. If the ads are correct, such ads may be transferred back to auto-check operations 250 for a final screening, or may be stored as approved ads 270.

Manual review facility 260 may also review sets of ads from storage facility 220 that are too small (e.g., that were submitted by an advertiser 210 which is neither a large advertiser, nor a frequent advertiser).

In another embodiment consistent with the invention, if advertiser 210 is a Trusted Advertiser, ads placed into storage facility 220 and transferred to ad preprocessing operations 230 might be recognized as being provided by a Trusted Advertiser. Ad preprocessing operations 230 may then transfer the ads directly to auto-check operations 250 for further processing as described above.

In yet another embodiment consistent with the invention, a sample of approved ads 270 submitted by a Trusted Advertiser 210 could be selected by spot check operations 290 for manual review and determination of a new distrust score. If the new distrust score is below the threshold, all the ads from that Trusted Advertiser could continue to be sent directly to auto-check operations 250. Conversely, if the new distrust score is at or above the threshold, the spot-check operations 290 might automatically pull all or a portion of the ads previously placed in circulation/syndication from that Trusted Advertiser. Additionally, the spot check operations 290 might remove the designation of "Trusted Advertiser" from advertiser information 240. At this point, the ad network could work with advertiser 210 to improve future ads submitted by advertiser 210, so that they would conform with the Trusted Advertiser standards. Thus, the spot check operations 290 may be used to validate (continuously, periodically, responsive to the occurrence of some condition, etc.) the status of a trusted advertiser.

Because advertiser 210 would not want to lose its status of Trusted Advertiser, which would result in slower approval of submitted ads, advertiser 210 might have the incentive to more carefully monitor the ads it submits and improve its quality control before submitting future ads to the ad network.

Thus, the present invention allows for the automatic approval of large numbers of ads, rather than the use of a cumbersome, error-prone method of manually approving each ad prior to placement into circulation/syndication.

4.2 Exemplary Embodiments

4.2.1 Exemplary Methods

Figure 3:
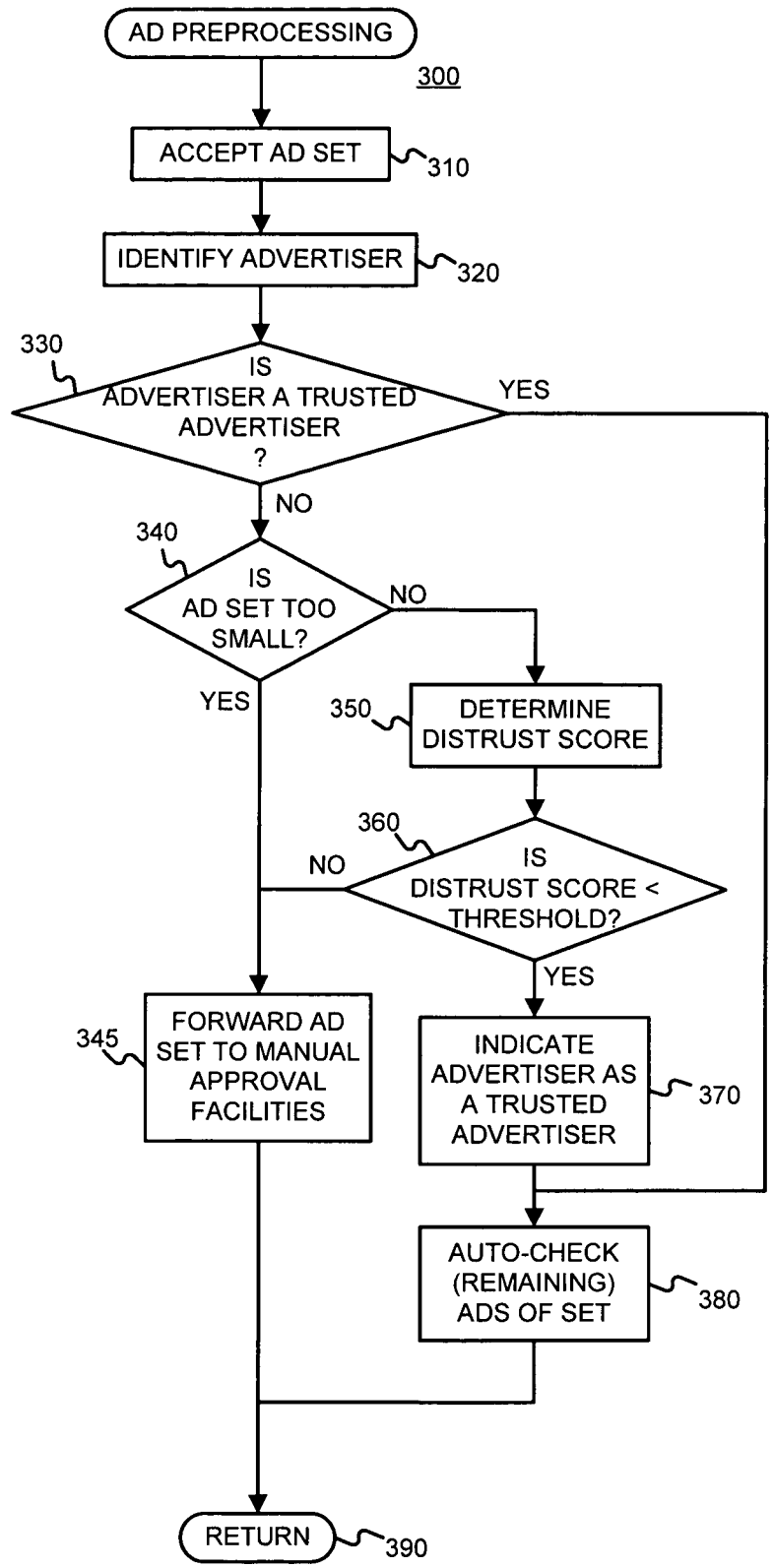
FIG. 3 is a flowchart illustrating an exemplary method that may be used to preprocess ads in a manner consistent with the present invention.

FIG. 3 is a flow diagram of an exemplary method 300 for preprocessing ads in a manner consistent with the present invention. An ad set from an advertiser is accepted (Block 310), and the advertiser is identified (Block 320). If the advertiser is a Trusted Advertiser, the ad set is auto-checked (Block 380). In this case, none of the submitted ads are manually reviewed.

If the advertiser is not a Trusted Advertiser, the size of the ad set is evaluated (Block 340). If the number of ads is too small, the submitting advertiser is not a candidate for being labeled a Trusted Advertiser, and the ads are forwarded to manual review facilities (Block 345). If the number of ads is sufficient to consider the advertiser as a Trusted Advertiser, a distrust score is determined (Block 350).

If the determined distrust score is below a predetermined threshold (e.g., 3% to 5%) (Block 360), the advertiser is indicated as a Trusted Advertiser (Block 370). The ads in the submitted ad set that were not manually reviewed in the process of determining the distrust score (Block 350) are then auto-checked (Block 380), without further manual review.

If, on the other hand, the determined trust score is not below the threshold (Block 360), the ads in the submitted ad set that were not manually reviewed in the process of determining the distrust score (Block 350) are then forwarded directly to manual review facilities (Block 345).

Figure 4:
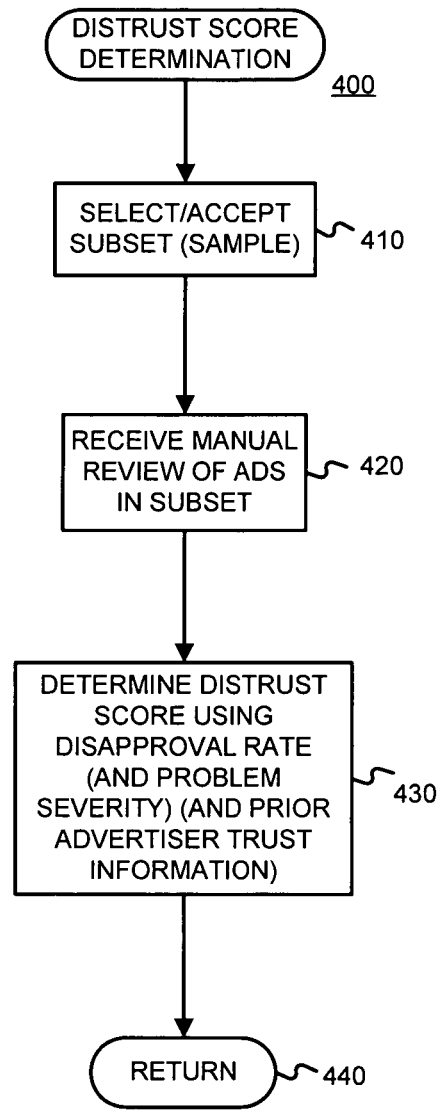
FIG. 4 is a flowchart illustrating an exemplary method that may be used to determine a distrust score in a manner consistent with the present invention.

FIG. 4 is a flow diagram of an exemplary method 400 that may be used to determine a distrust score in a manner consistent with the present invention. A subset of the submitted ad set is selected or accepted (Block 410). This subset could be any desired representative sample of the ad set. The subset of ads is provided for manual review and a manual review is received (Block 420). Finally, a distrust score is determined using at least a disapproval rate of the received manual review (Block 430). The determination of a distrust score may also consider the severity of any problems discovered by the manual review. The determination of a distrust score may also consider prior advertiser trust information.

Thus, the number of ads disapproved, as well as the reasons for disapproval, may be considered. The reason for disapproval of each ad can then be translated into a weighting factor for that disapproval. The percentage of disapproved ads in the subset to the total number of ads in the subset may be adjusted according to the weighting factor(s) of the disapproved ad(s).

4.2.2 Examples of Operations

Example 1

Assume, for example, that the number of ads in the submitted ad set is 10,000. The sample (subset) is chosen as 1000 randomly selected ads from the 10,000. These ads are manually reviewed. Assume that 30 are disapproved; 20 for spelling errors (weighting factor of 1), and 10 for inappropriate content (weighting factor of 3).

| Total ads | 10,000 |
|---|---|
| Subset | 1,000 |
| Problems | 20 spelling × 1.0 (factor) = 20 |
| | 10 content × 3.0 (factor) = 30 |
| Totals | 30 or 3% (raw)   50 or 5% (adjusted) |

The raw percentage of disapproved ads is 30÷1000, or 3%. However, after applying the factors according to the weightings based on the reasons for disapproval, the weighted total is 50, resulting in an adjusted percentage of 50÷1000, or 5%. This adjusted percentage could also be characterized as a distrust score of 5%.

If the threshold is predetermined to be 4%, the distrust score of 5% would exceed the threshold (Block 360 on FIG. 3), and the advertiser would not be a Trusted Advertiser. All 10,000 ads would then be forwarded for manual review (Recall block 345 on FIG. 3.).

Conversely, if the threshold was instead set at 6%, the advertiser in this example would be labeled a Trusted Advertiser, and all 10,000 ads in the ad set (or at least the remaining 9,000 ads not already manually checked) could be auto-checked (Recall block 380 of FIG. 3.). Further, new ads submitted by this Trusted Advertiser may be automatically approved (Recall block 330 of FIG. 3.) and could be auto-checked (Recall block 380.).

Example 2

Advertiser A has a current backlog of 210,000 ad groups. A sample of 18,600 ad groups was reviewed manually. The number of ads disapproved in sample was 334. Thus, less than 2% (0.017=334/18,600) of ad groups were found to contain errors—mostly editorial (e.g., spacing, extra period, etc.).

The number of ad groups that will have their syndication declined, along with the reasons for disapproval, (except for forbidden ad text and unacceptable content which will be caught by auto-check operations) are listed below:

3,700 (=210,000*0.017)

Top reasons for disapproval:
  38% punctuation
  15% capitalization
  9% Incorrect price 8% forbidden ad text (will be caught by filter and routed to manual review bin)

7% grammar

2% Unacceptable content (will be caught by filter and routed to manual review bin)

Other reasons: Repetition, text spacing, lists, superlatives, promotional offer, keywords too general The ad groups that have been disapproved for forbidden ad text or unacceptable content will be caught by the auto-check operations and sent to a manual review bin. The reasons for disapproval can be tracked and reported to Advertiser A to help them avoid future disapprovals.

If all of the foregoing ad groups were to be manually reviewed, it is estimated that it would take 5 people, 28 weeks to review the current backlog with a potential human error of 3%-5%.

4.2.3 Alternatives and Refinements

In one embodiment, if the determined distrust score (Block 350) is close to the threshold, a larger sample set or subset may be manually evaluated, in order to clarify the determination of indicating the advertiser as a Trusted Advertiser or not.

In another embodiment, auto-check may be used to screen the ads for preselected content. If any of the ads contain such content, such ads may either be (a) disapproved, or (b) transferred to a manual review facility. The ads that don't contain any of the predetermined content are stored as approved ads and are available for serving.

On an occasional, or "spot check" basis, a sample or subset of ads submitted by a Trusted Advertiser can be identified, and a distrust score can be determined for them. If it is determined that the distrust score is above the threshold, all of the existing approved ads of that advertiser might be pulled. Additionally, the ad group may be manually reviewed. Finally, the designation of Trusted Advertiser may be removed. However, if the distrust score of the ads from the Trusted Advertiser is below the threshold, the Trusted Advertiser would retain that designation.

Alternatively, a different threshold could be used when spot checking Trusted Advertisers, either higher or lower than the normal threshold, but preferably higher.

In another embodiment, any significant increase in the distrust score of a Trusted Advertiser could initiate a more intensive review, because of the indication that the quality of ads from that Trusted Advertiser was beginning to slip. Similarly, distrust scores, or information from which distrust scores are derived, may be time weighted so that recent improvements or declines might be amplified.

Although the invention was described with reference to a set of ads from an advertiser, it may be applied to a set of ads from any source. For example, a third party firm might provide ad copy services. Such a third party might be designated as a "trusted source."

Although at least some of the embodiments above were described with reference to a manual review facility, in at least some embodiments consistent with the present invention, some other review process other than a manual review process may be used. Such other review processes may be expensive in terms of one or more of (a) time, (b) money, (c) manpower resources, (d) computer resources, etc.

4.2.4 Exemplary Apparatus

Figure 5:
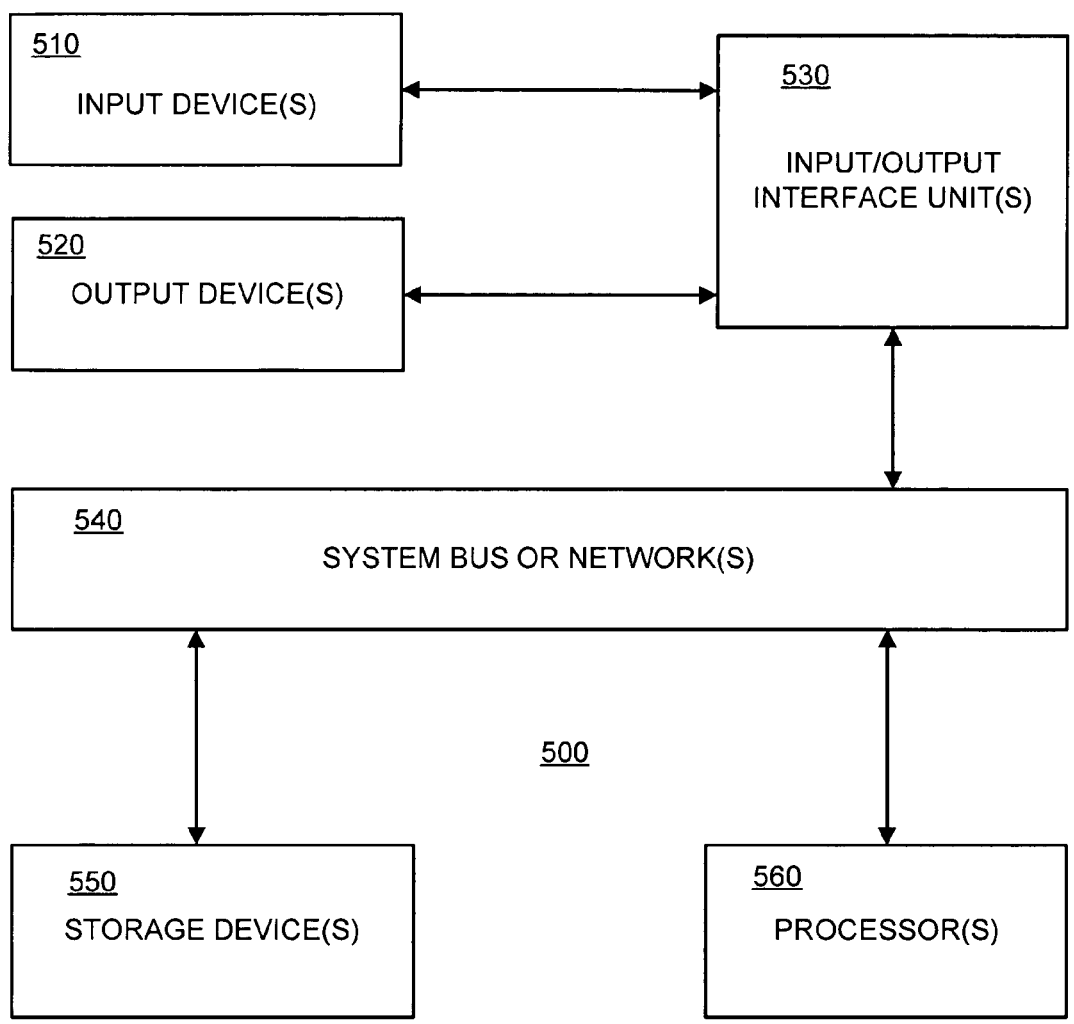
FIG. 5 is a block diagram of a machine that may perform one or more operations, and store information used and/or generated, in a manner consistent with the present invention.

FIG. 5 is block diagram of a machine 500 that may perform one or more of the operations discussed above. The machine 500 may include one or more processors 560, one or more input/output interface units 530, one or more storage devices 550, and one or more system buses and/or networks 540 for facilitating the communication of information among the coupled elements. One or more input devices 510 and one or more output devices 520 may be coupled with the one or more input/output interfaces 530.

The one or more processors 560 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the one or more storage devices 550 and/or may be received from an external source via one or more input/output interface units 530.

In one embodiment, the machine 500 may be one or more conventional personal computers. In this case, the processing units 560 may be one or more microprocessors. The bus 540 may include a system bus. The storage devices 550 may include system memory, such as read only memory (ROM) and/or random access memory (RAM). The storage devices 550 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 510, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 560 through an appropriate interface 530 coupled to the system bus 540. The output devices 520 may include a monitor or other type of display device, which may also be connected to the system bus 540 via an appropriate interface. In addition to (or instead of) the monitor, the personal computer may include other (peripheral) output devices (not shown), such as speakers and printers for example.

The various operations described above may be performed by one or more machines 500, and the various information described above may be stored on one or more machines 500.

4.3 Conclusions

As can be appreciated from the foregoing disclosure, the present invention can be used to automatically approve ads submitted by advertisers, rather than employ the cumbersome, expensive, and error-prone manual reviews of each of many ads submitted by an advertiser, with the resultant delay in putting those ads into circulation or syndication. Many parts of the process can be automated through the use of some of the embodiments of the invention. Auto-checks further ensure the quality of the ads, to minimize the chance of inappropriate or incorrect ads being placed into circulation or syndication.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

What is claimed is:

1. A method comprising:
   receiving, on a computer system, (i) a set of advertisements from an advertiser, and (ii) an advertiser identifier for the advertiser;

accessing a data repository configured to store a plurality of trust status indicators and a plurality of advertiser identifiers for a plurality of advertisers, with a particular trust status indicator (i) specifying whether a particular advertiser is one of a plurality of trusted advertisers, and (ii) corresponding to a particular advertiser identifier for the particular advertiser;

identifying, from the plurality of trust status indicators and the plurality of advertiser identifiers, a trust status indicator corresponding to the advertiser identifier of the advertiser;

if the trust status indicator for the advertiser indicates that the advertiser is one of the plurality of trusted advertisers:
submitting the set of advertisements for review using an automated review process that approves an advertisement based on content of the advertisement;

if the trust status indicator for the advertiser indicates that the advertiser is a distrusted advertiser:
selecting a first subset of advertisements from the set of advertisements;
determining a first amount of advertisements in the first subset of advertisements that are declined for a first reason;
determining a second amount of advertisements in the first subset of advertisements that are declined for a second reason;
applying a first weighting factor to the first amount of advertisements that are declined for the first reason to generate a first trust score component;
applying a second weighting factor to the second amount of advertisements that are declined for the second reason to generate a second trust score component; and
generating a trust score for the advertiser at least partly based on the first trust score component and the second trust score component;
if the trust score is greater than or equal to a threshold trust score:
submitting a second subset of advertisements from the set of advertisements to the automated review process; and
if the trust score is less than the threshold trust score:
submitting the second subset of advertisements to a manual review process in which advertisements are approved based on content of the advertisements; and transferring approved advertisements of the set of advertisements to an advertisement server.

2. The method of claim 1, wherein the trust score indicates a degree of distrust in the advertiser.

3. The method of claim 1, wherein the first amount of advertisements comprises a percentage of advertisements in the first subset that are declined for the first reason.

4. The method of claim 1, wherein the set of advertisements comprises one or more Web advertisements.

5. The method of claim 1, further comprising:
automatically screening the approved advertisements for one or more preselected words.

6. The method of claim 5, wherein at least one of the one or more preselected words comprises a uniform resource location.

7. The method of claim 1, wherein receiving the set of advertisements from the advertiser comprises receiving advertisements from a syndication system that is configured to aggregate and to collect advertisements from third parties that submit third party advertisements to the syndication system for placement on a web page of a content publisher.

8. The method of claim 1, wherein receiving the set of advertisements from the advertiser comprises receiving the advertisements directly from a system of an organization that produced the advertisements.

9. The method of claim 1, wherein transferring approved advertisements of the set comprises designating the approved advertisements for placement in an advertisement syndication network.

10. A method comprising:
receiving, on a computer system, (i) a set of advertisements from an advertiser, and (ii) an advertiser identifier for the advertiser;
accessing a data repository configured to store a plurality of trust status indicators and a plurality of advertiser identifiers for a plurality of advertisers, with a particular trust status indicator (i) specifying whether a particular advertiser is one of a plurality of trusted advertisers, and (ii) corresponding to a particular advertiser identifier for the particular advertiser;
identifying, in the data repository from the plurality of trust status indicators stored in the data repository and the plurality of advertiser identifiers stored in the data repository, a trust status indicator that is stored in the data repository and that corresponds to the advertiser identifier of the advertiser;
determining, based on the trust status indicator, that the advertiser is a trusted advertiser;
selecting, from the set of advertisements, a subset of advertisements;
receiving information indicative of one or more disapproved advertisements in the subset, with a disapproved advertisement comprising an advertisement that is incompliant with one or more advertisement requirements;
receiving information indicative of one or more approved advertisements in the subset, with an approved advertisement comprising an advertisement that is in compliance with the one or more advertisement requirements;
determining a trust score using (i) the information indicative of the one or more disapproved advertisements in the subset, (ii) the information indicative of the one or more approved advertisements in the subset, and (ii) one or more reasons for disapproval of the one or more disapproved advertisements;
detecting from the trust score a change in a trust status of the advertiser from being the trusted advertiser to being a distrusted advertiser; and
removing from circulation at least one advertisement in the set of advertisements.

11. The method of claim 10, wherein the information indicative of the one or more disapproved advertisements is received from a system configured for use in a manual review process.

12. A system comprising:
one or more processing devices; and
one or more machine-readable hardware storage devices storing instructions that are executable by the one or more processing devices to perform operations comprising:
receiving (i) a set of advertisements from an advertiser, and (ii) an advertiser identifier for the advertiser;
accessing a data repository configured to store a plurality of trust status indicators and a plurality of advertiser identifiers for a plurality of advertisers, with a particular trust status indicator (i) specifying whether a particular advertiser is one of a plurality of trusted advertisers, and (ii) corresponding to a particular advertiser identifier for the particular advertiser;

identifying, from the plurality of trust status indicators and the plurality of advertiser identifiers, a trust status indicator corresponding to the advertiser identifier of the advertiser;

if the trust status indicator for the advertiser indicates that the advertiser is one of the plurality of trusted advertisers:
submitting the set of advertisements for review using an automated review process that approves an advertisement based on content of the advertisement;

if the trust status indicator for the advertiser indicates that the advertiser is a distrusted advertiser:
selecting a first subset of advertisements from the set of advertisements;
determining a first amount of advertisements in the first subset of advertisements that are declined for a first reason;
determining a second amount of advertisements in the first subset of advertisements that are declined for a second reason;
applying a first weighting factor to the first amount of advertisements that are declined for the first reason to generate a first trust score component;
applying a second weighting factor to the second amount of advertisements that are declined for the second reason to generate a second trust score component; and
generating a trust score for the advertiser at least partly based on the first trust score component and the second trust score component;
if the trust score is greater than or equal to a threshold trust score:
submitting a second subset of advertisements from the set of advertisements to the automated review process; and
if the trust score is less than the threshold trust score:
submitting the second subset of advertisements to a manual review process in which advertisements are approved based on content of the advertisements; and
transferring approved advertisements of the set of advertisements to an advertisement server.

13. The system of claim 12, wherein transferring approved advertisements of the set comprises designating the approved advertisements for placement in an advertisement syndication network.

14. The system of claim 12, wherein the trust score indicates a degree of distrust in the advertiser.

15. The system of claim 12, wherein the first amount of advertisements comprises a percentage of advertisements in the first subset that are declined for the first reason.

16. The system of claim 12, wherein the set of advertisements comprises one or more Web advertisements.

17. The system of claim 12, wherein the operations further comprise:
automatically screening the approved advertisements for one or more preselected words or phrases.

18. The system of claim 17, wherein at least one of the one or more preselected words comprises a uniform resource location.

19. The system of claim 12, wherein receiving the set of advertisements from the advertiser comprises receiving advertisements from a syndication system that is configured to aggregate and to collect advertisements from third parties that submit third party advertisements to the syndication system for placement on a web page of a content publisher.

20. The system of claim 12, wherein receiving the set of advertisements from the advertiser comprises receiving the advertisements directly from a system of an organization that produced the advertisements.

21. The system of claim 12, wherein transferring approved advertisements of the set comprises designating the approved advertisements for placement in an advertisement syndication network.

22. One or more machine-readable hardware storage devices instructions that are executable by one or more processing devices to perform operations comprising:
receiving (i) a set of advertisements from an advertiser, and (ii) an advertiser identifier for the advertiser;
accessing a data repository configured to store a plurality of trust status indicators and a plurality of advertiser identifiers for a plurality of advertisers, with a particular trust status indicator (i) specifying whether a particular advertiser is one of a plurality of trusted advertisers, and (ii) corresponding to a particular advertiser identifier for the particular advertiser;
identifying, from the plurality of trust status indicators and the plurality of advertiser identifiers, a trust status indicator corresponding to the advertiser identifier of the advertiser;
if the trust status indicator for the advertiser indicates that the advertiser is one of the plurality of trusted advertisers:
submitting the set of advertisements for review using an automated review process that approves an advertisement based on content of the advertisement;
if the trust status indicator for the advertiser indicates that the advertiser is a distrusted advertiser:
selecting a first subset of advertisements from the set of advertisements;
determining a first amount of advertisements in the first subset of advertisements that are declined for a first reason;
determining a second amount of advertisements in the first subset of advertisements that are declined for a second reason;
applying a first weighting factor to the first amount of advertisements that are declined for the first reason to generate a first trust score component;
applying a second weighting factor to the second amount of advertisements that are declined for the second reason to generate a second trust score component; and
generating a trust score for the advertiser at least partly based on the first trust score component and the second trust score component;
if the trust score is greater than or equal to a threshold trust score:
submitting a second subset of advertisements from the set of advertisements to the automated review process; and
if the trust score is less than the threshold trust score:
submitting the second subset of advertisements to a manual review process in which advertisements are approved based on content of the advertisements; and
transferring approved advertisements of the set of advertisements to an advertisement server.

23. The one or more machine-readable hardware storage devices of claim 22, wherein the trust score indicates a degree of distrust in the advertiser.

24. The one or more machine-readable hardware storage devices of claim 22, wherein the first amount of advertisements comprises a percentage of advertisements in the first subset that are declined for the first reason.

25. The one or more machine-readable hardware storage devices of claim 22, wherein the set of advertisements comprises one or more Web advertisements.

26. The one or more machine-readable hardware storage devices of claim 22, wherein the operations further comprise:
   automatically screening the approved advertisements for one or more preselected words or phrases.

27. The one or more machine-readable hardware storage devices of claim 26, wherein at least one of the one or more preselected words comprises a uniform resource location.

28. The one or more machine-readable hardware storage devices of claim 22, wherein receiving the set of advertisements from the advertiser comprises receiving advertisements from a syndication system that is configured to aggregate and to collect advertisements from third parties that submit third party advertisements to the syndication system for placement on a web page of a content publisher.

29. The one or more machine-readable hardware storage devices of claim 22, wherein receiving the set of advertisements from the advertiser comprises receiving the advertisements directly from a system of an organization that produced the advertisements.

* * * * *